US008563909B2

(12) United States Patent
Janiak et al.

(10) Patent No.: US 8,563,909 B2
(45) Date of Patent: Oct. 22, 2013

(54) AUTOMATIC RE-INITIALIZATION OF RESONANT SENSORS IN ROCKET AND MISSILE GUIDANCE SYSTEMS

(75) Inventors: Derek P. Janiak, Manchester, NH (US); James H. Steenson, Jr., New Boston, NH (US); David Schorr, Austin, TX (US); Stephen W. Bartlett, Saltash (GB)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 13/378,070

(22) PCT Filed: Apr. 8, 2011

(86) PCT No.: PCT/US2011/031657
§ 371 (c)(1),
(2), (4) Date: Mar. 9, 2012

(87) PCT Pub. No.: WO2012/005786
PCT Pub. Date: Jan. 12, 2012

(65) Prior Publication Data
US 2012/0153070 A1      Jun. 21, 2012

Related U.S. Application Data

(60) Provisional application No. 61/322,321, filed on Apr. 9, 2010.

(51) Int. Cl.
*G06F 11/07* (2006.01)
*G06F 11/30* (2006.01)
*F41G 9/00* (2006.01)
*G01C 19/00* (2013.01)
*F41G 7/36* (2006.01)

(52) U.S. Cl.
USPC ............. 244/3.1; 244/3.15; 244/3.2; 701/1; 701/3; 702/85; 702/104; 702/105; 702/108; 702/113; 702/116; 714/100; 714/1; 714/2; 714/23; 714/25

(58) Field of Classification Search
USPC .......... 244/3.1–3.3; 701/1, 3; 702/85, 90, 91, 702/104, 105, 108, 113–116; 714/100, 1, 2, 714/23, 25, 48
See application file for complete search history.

(56) References Cited

U.S. PATENT DOCUMENTS 3,140,482 A * 7/1964 Duncan et al. ............... 244/3.15
3,483,384 A * 12/1969 Pinson ......................... 244/3.18

(Continued)

FOREIGN PATENT DOCUMENTS

JP          6117800       4/1994

*Primary Examiner* — Bernarr Gregory
(74) *Attorney, Agent, or Firm* — Daniel J. Long; Maine Cernota & Rardin; Douglas Peter Burum

(57) ABSTRACT

An apparatus and method improves the fault tolerance of a rocket or missile guidance system which includes a resonant sensor. When improper initialization is detected, the resonant sensor is reinitialized, repeatedly if necessary, until normal operation is achieved. Improper initialization is detected by comparing data from the guidance system with pre-specified physical limits to roll, pitch, yaw, and/or other features of the flight scenario. Embodiments can also detect a fault condition due to an error signal from a "Built-in-Test" (BIT) module. The initialization sequence initiated by the invention can be identical to the power-on sequence, or it can be a separate, reinitiating sequence. Subsequent resets are initiated as needed, for example until the burn of the rocket fuel and the associated vibrations have ceased and the resonant sensor has been successfully initialized.

14 Claims, 2 Drawing Sheets

(56) References Cited

U.S. PATENT DOCUMENTS

| | | | |
|---|---|---|---|
| 3,567,163 A * | 3/1971 | Kepp et al. | 244/3.14 |
| 3,832,711 A * | 8/1974 | Grant et al. | 244/3.19 |
| 3,937,423 A * | 2/1976 | Johansen | 244/3.22 |
| 3,990,657 A * | 11/1976 | Schott | 244/3.15 |
| 3,998,409 A * | 12/1976 | Pistiner | 244/3.21 |
| 3,999,729 A * | 12/1976 | Muhlfelder et al. | 244/3.21 |
| 4,508,293 A * | 4/1985 | Jones | 244/3.15 |
| 4,654,663 A | 3/1987 | Alsenz et al. | |
| 5,150,856 A * | 9/1992 | Gaide | 244/3.2 |
| 5,360,184 A | 11/1994 | Johnson | |
| 5,451,014 A * | 9/1995 | Dare et al. | 244/3.15 |
| 5,490,093 A * | 2/1996 | Koepke | 702/90 |
| 5,721,680 A * | 2/1998 | Van Cleve et al. | 701/3 |
| 5,799,899 A * | 9/1998 | Wells et al. | 244/3.11 |
| 5,808,578 A * | 9/1998 | Barbella et al. | 244/3.19 |
| 5,811,788 A * | 9/1998 | Wicke | 244/3.1 |
| 5,862,496 A * | 1/1999 | Biven | 701/3 |
| 6,199,028 B1 * | 3/2001 | Repperger et al. | 244/3.1 |
| 6,293,148 B1 | 9/2001 | Wang et al. | |
| 6,330,690 B1 * | 12/2001 | Nouri et al. | 714/23 |
| 7,795,565 B2 * | 9/2010 | Bock | 244/3.15 |
| 7,979,231 B2 * | 7/2011 | Eckert | 702/104 |

* cited by examiner

AUTOMATIC RE-INITIALIZATION OF RESONANT SENSORS IN ROCKET AND MISSILE GUIDANCE SYSTEMS

RELATED APPLICATIONS

This application is a national phase application filed under 35 USC§371 of PCT Application No. PCT/US2011/031657 with an International filing date of Apr. 8, 2011, which claims the benefit of U.S. Provisional Application No. 61/322,321, filed Apr. 9, 2010. Each of these applications is herein incorporated by reference in their entirety for all purposes.

STATEMENT OF GOVERNMENT INTEREST

The invention was made with United States Government support under Contract No. W31P4Q-06-C-0330 awarded by the Navy. The United States Government has certain rights in this invention.

FIELD OF THE INVENTION

The invention relates to rocket and missile guidance systems, and more particularly to apparatus and methods that improve the fault tolerance of a guidance system which includes at least one resonant sensor.

BACKGROUND OF THE INVENTION

Resonant sensors are devices which use mechanical vibrations, typically induced at a specific resonant frequency, to detect any of a variety of conditions. Typical implementations include "tuning fork" resonators, piezo-electric resonators, hemispherical resonators, and tilting wheel resonators. In many cases, resonant sensors (such as Micro-Electro-Mechanical Systems [MEMS] sensors) can be compact, low in cost, and highly accurate. Because of the inherent sensitivity of most vibrating systems to physical manipulations, resonant sensors can be used to detect accelerations and rotations, and are often used in accelerometers and in devices which detect rotations (referred to sometimes as "gyroscopes," although not based on the classic "spinning top" gyroscope approach).

Resonant sensor accelerometers, gyroscopes, and other resonant sensors that are critical to flight guidance algorithms, are frequently used in guided rockets and missiles, which typically have severe vibration environments. Under some circumstances, including the burn of the rocket motor fuel, the body vibrations may induce a resonant frequency at, or close to, the resonant frequency of the sensor, which can interfere with the initialization of the device and can cause the device to provide highly inaccurate data.

In many cases, for example for many air-to-surface missiles, the rocket motor burn lasts for only a short period of time after the initial launch of the rocket, such as a few seconds, after which the rocket glides to its target with relatively low vibrations. However, if the guidance system has been improperly initialized due to vibrations during the initial fuel burn, then the guidance system may provide highly erroneous data, both during and after the burn, and the missile may accept the data from the guidance system as if it were accurate, thereby causing the missile to rapidly deviate from its intended course.

Typically, this problem is addressed by providing shock isolators, which attempt to isolate the resonant sensors from shocks and vibrations experienced by the rocket or missile. However, this approach can be inadequate and/or impractical.

Some guidance systems include a "Built-in-Test" (BIT) fault detector. However, these fault detectors can also be fooled by vibrations of the rocket or missile, and can fail to detect if a resonant sensor has been improperly initialized.

What is needed, therefore, is a system for reliably detecting when a rocket or missile guidance system which includes at least one resonant sensor has been improperly initialized, and providing appropriate corrective action, so as to improve the fault tolerance of the guidance system.

SUMMARY OF THE INVENTION

The present invention is an apparatus and method for improving the fault tolerance of a rocket or missile guidance system which includes at least one resonant sensor. The invention determines if the guidance system has been properly initialized, and causes, the guidance system to reset and reinitialize itself if it has not been properly initialized. This is repeated, if necessary, until proper initialization and operation of the resonant sensor is achieved. Abnormal operation of the resonant sensor is detected by comparing guidance data provided by the guidance system with specified physical limits which are applicable to the rocket or missile, and determining that the guidance system has not been properly initialized if it reports "unphysical" guidance data which falls outside of the specified physical limits. For example, if the guidance data indicates a rate of rotation, pitch, or yaw which is not physically attainable by the rocket or missile, or at least is highly improbable, then the invention will determine that the guidance system is not functioning properly.

In some embodiments, a fault condition can also be detected by evaluating data from an already existing "Built-in-Test" (BIT) fault detector. However, even if the BIT fault detector fails to report a fault, the present invention will still determine that the guidance system is not operating properly if the guidance data provided by the guidance system is deemed to be unphysical.

Once a fault condition is detected, an initialization sequence of the resonant sensor is initiated. The invention continues to monitor and evaluate the guidance data, and subsequent resets are initiated as needed, until successful reinitialization of the resonant sensor is achieved, for example after the burn of the rocket motor fuel and the associated vibrations have ended. In various embodiments, monitoring of the guidance data provided by the guidance system continues even after successful initialization is achieved, and further resets are initiated if non-physical data is once again detected, for example due to vibrations caused by a nearby burst of an anti-aircraft shell.

One general aspect of the present invention is an apparatus for improving a fault tolerance of a rocket or missile guidance system which includes at least one resonant sensor. The apparatus includes a fault detection module which is configured to receive guidance data originating from the resonant sensor, compare the guidance data with specified physical performance limits of the rocket or missile, determine if the guidance data exceeds the physical performance limits, and transmit a fault detection signal if the guidance data exceeds the physical performance limits. The apparatus further includes a reset module configured to receive the fault detection signal from the fault detection module, the reset module being configured to initiate a reinitializing sequence which will reinitialize the resonant sensor when the fault detection signal is received from the fault detection module.

In embodiments, the apparatus further includes a Built-In Test (BIT) module cooperative with the resonant sensor and configured to detect at least one failure modality of the resonant sensor, the BIT module being configured to transmit a BIT error signal if it detects at least one failure modality, the fault detection module being configured to receive the BIT error signal and to transmit the fault detection signal when it receives the BIT error signal.

In some embodiments, the reinitializing sequence is substantially identical to a power-up initializing sequence which initializes the resonant sensor upon activation of the rocket or missile.

Various embodiments further include a data output module cooperative with the resonant sensor and configured to receive the fault detection signal from the fault detection module, the data output module being configured to prevent the rocket or missile from acting upon the guidance data when the fault detection signal is received from the fault detection module.

In certain embodiments, the specified physical performance limits include at least one limit pertaining to roll of the rocket or missile. In some embodiments the specified physical performance limits include at least one limit relating to pitch of the rocket or missile. And in other embodiments the specified physical performance limits include at least one limit relating to yaw of the rocket or missile.

Another general aspect of the present invention is a method for improving a fault tolerance of a rocket or missile guidance system, the rocket or missile guidance system including at least one resonant sensor. The method includes receiving guidance data from the guidance system, comparing the guidance data with specified physical performance limits of the rocket or missile, determining if the guidance data exceeds the physical performance limits, and, if the guidance data exceeds the physical performance limits, initiating a reinitializing sequence which will reinitialize the resonant sensor.

In some embodiments, the method further includes determining if a Built-In Test (BIT) module cooperative with the resonant sensor has detected improper operation of the resonant sensor, and initiating the reinitializing sequence if the BIT has detected improper operation of the resonant sensor.

In certain embodiments the reinitializing sequence is substantially identical to a power-up initializing sequence which initializes the resonant sensor upon activation of the rocket or missile. Some embodiments further include preventing the rocket or missile from acting upon the guidance data when the fault detection signal is received from the fault detection module.

In various embodiments the specified physical performance limits include at least one limit pertaining to roll of the rocket or missile. In some embodiments, the specified physical performance limits include at least one limit pertaining to pitch of the rocket or missile. And in other embodiments the specified physical performance limits include at least one limit pertaining to yaw of the rocket or missile.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
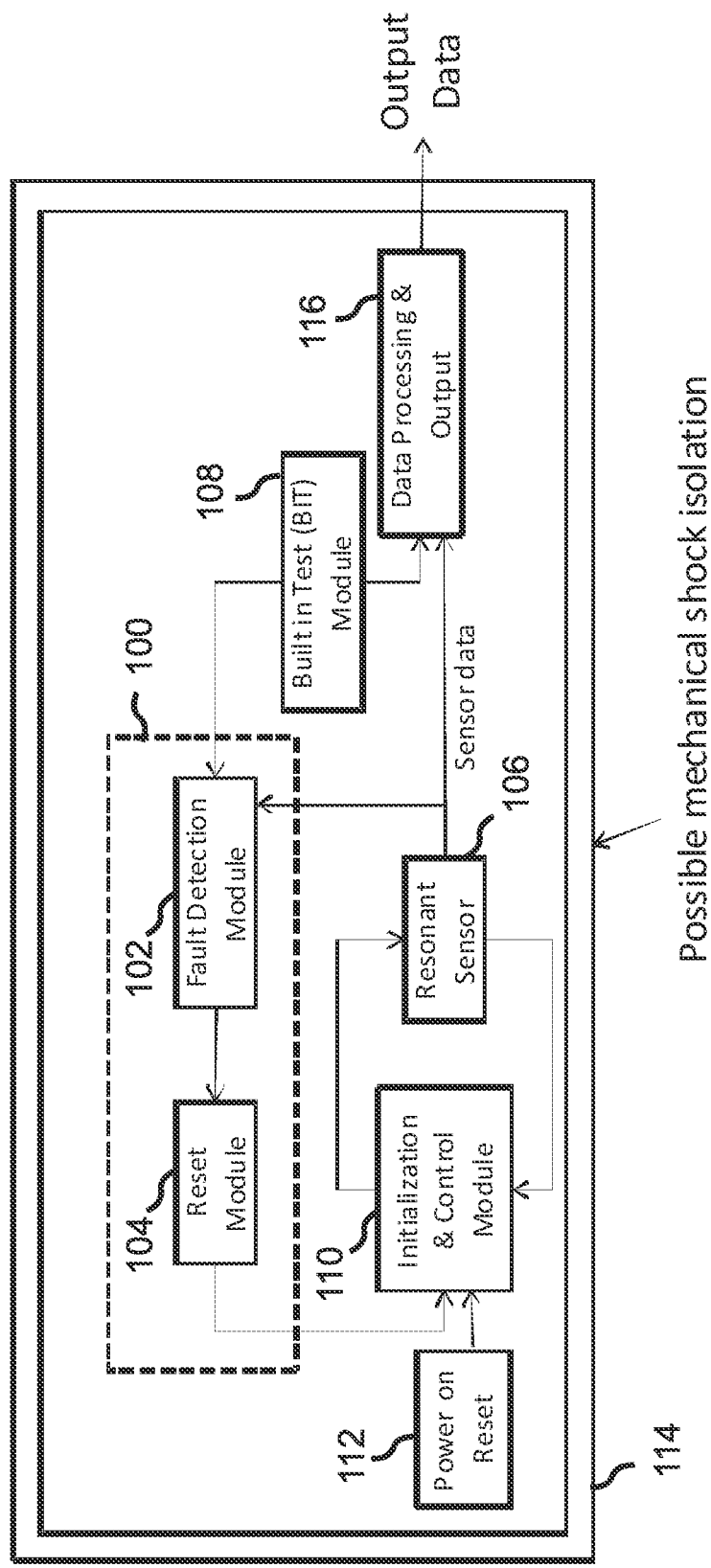
FIG. 1 is a block diagram illustrating an embodiment of the apparatus of the present invention.

The present invention is an apparatus and method for improving the fault tolerance of a rocket or missile guidance system which includes at least one resonant sensor. FIG. 1 illustrates an embodiment 100 of the apparatus of the present invention, which includes a fault detection module 102 and a reset module 104.

In the embodiment of FIG. 1, both the guidance data provided by the resonant sensor 106 and the output of a Built-in Test Module 108 are provided to the Fault Detection Module 102. Accordingly, in this embodiment the Fault Detection Module 102 can detect a fault condition in either of two ways, by evaluating the guidance data received from the resonant sensor 106 and recognizing that the guidance data is unphysical and inconsistent with the flight scenario, or by evaluating the "Built-in-Test" (BIT) results from the built-in fault detector 108. Typically, the BIT is configured to detect at least one failure modality of the resonant sensor, but the BIT may fail to report improper operation of the resonant sensor under some conditions.

In various embodiments, the Fault Detection Module 102 determines that there is a fault condition if the resonant sensor 106 reports unphysical guidance data, even if the BIT 108 does not report a fault. In other embodiments, the Fault Detection Module 102 determines that there is a fault condition if the BIT 108 reports a fault, even if the guidance data from the resonant sensor 106 appears to be physically reasonable. In various embodiments, a BIT 108 is not included, and the Fault Detection Module 102 depends entirely on the detection of unphysical guidance data from the resonant sensor 106.

In the embodiment of FIG. 1, once a fault condition is detected, the Fault Detection Module 102 triggers a Reset Module 104, which in turn activates the Initialization and Control Module 110 and thereby begins an initialization sequence of the resonant sensor 106. In some embodiments, the initialization sequence started by the Reset Module 104 is identical to the initialization sequence started by the Power-on Reset module 112 when the device is first started. In other embodiments, the Reset Module 104 starts a special initialization sequence that is optimized for resetting the Resonant Sensor 106 after a fault condition has been detected. Note that the embodiment of FIG. 1 also includes mechanical shock isolation 114, which reduces the influence of vibrations and shocks on the resonant sensor 106, but may not be able to ensure correct initialization and functioning of the resonant sensor 106 under all conditions.

If a fault condition is not detected by the Fault Detection Module 102, then the guidance data from the resonant sensor 106 is passed through a Data Processing and Output module 116 and used to control the flight path of the rocket or missile. However, if a fault condition is detected, then a fault signal is transmitted to the Data Processing and Output module 116, either directly by the Fault Detection Module 102 or, as shown in FIG. 1, routed through the BIT 108. This causes the Data Processing and Output module 116 to block the guidance data supplied by the resonant sensor 106, so that the flight path of the rocket or missile is not influenced by invalid guidance data.

Figure 2:
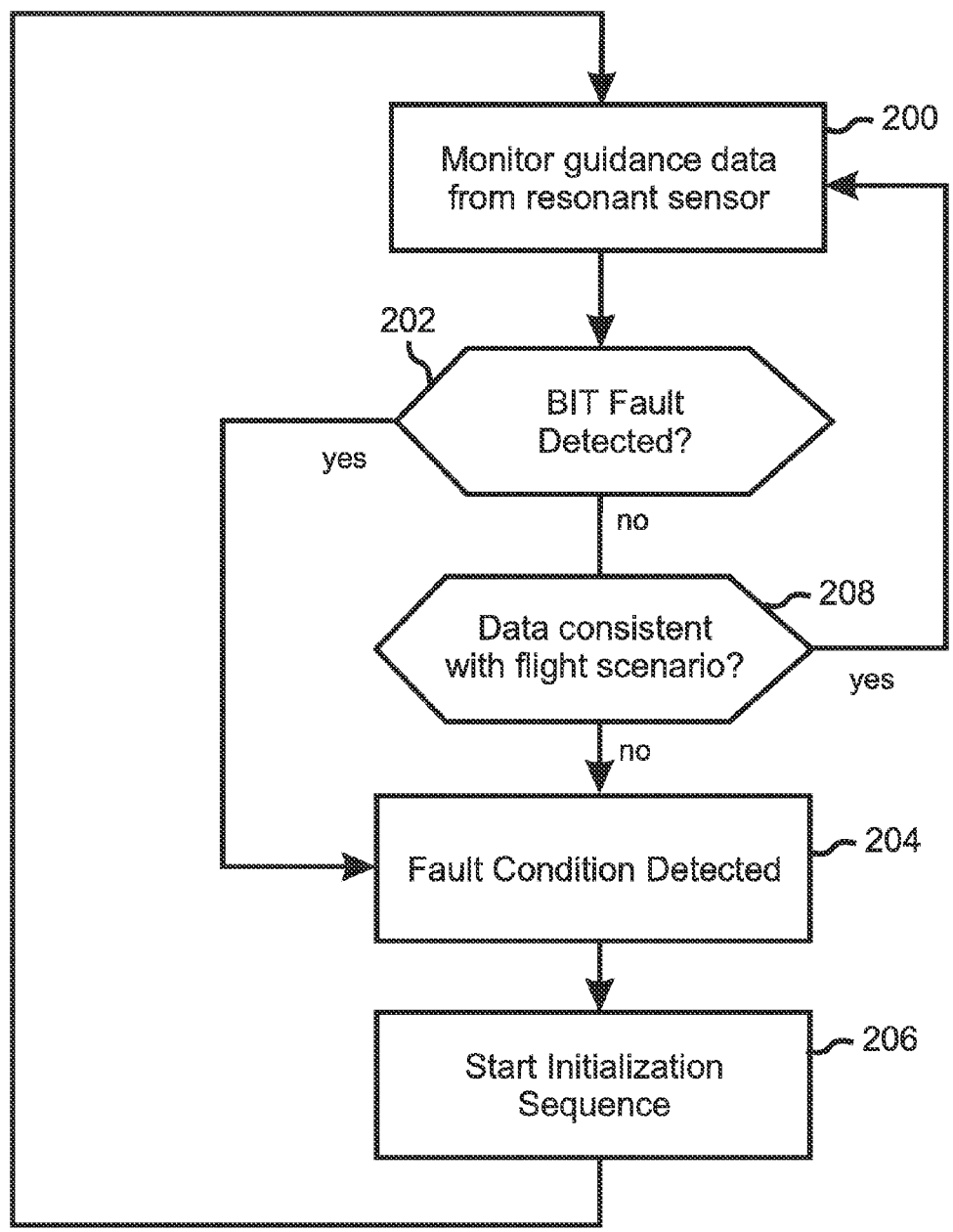
FIG. 2 is a flow diagram indicating an embodiment of the method of the present invention.

FIG. 2 illustrates the method of the present invention, which begins with monitoring 200 of the guidance data output from the resonant sensor 106 of the guidance system. If a fault is reported 202 by the BIT detector 108, then the Fault Detection Module 102 declares a fault 204 and an initialization sequence is stated 206. Otherwise, the data from the resonant sensor 106 is analyzed by the Fault Detection Module 102 to determine if the data is within specified physical limits 208. For example, if the missile is only capable of rotating at 10 Hz (or at least, 10 Hz is the maximum rotation which is likely to occur), and the guidance system reports that it is rotating at 50 Hz, then the result will be deemed unphysical, i.e. not consistent with the flight scenario, and a fault condition will be declared 204. Otherwise, the guidance system will be deemed to be operating correctly, and the guidance data will be used to guide the rocket or missile.

If a fault condition is detected 204, an initialization sequence is started 206, and the method returns to monitoring the guidance data output from the resonant sensor 200. If additional fault conditions are detected, subsequent resets 206 are initiated as needed, for example until the burn of the rocket motor fuel is completed and the associated vibrations have diminished. This process continues until the resonant sensor is successfully re-initialized and normal operation of the resonant sensor is achieved. In the embodiment of FIG. 2, the process continues even after the resonant sensor has been successfully re-initialized and the rocket burn has ended, so as to detect improper operation of the resonant sensor caused by other vibrations sources, such as severe air turbulence or an explosion of a nearby anti-aircraft shell, and reset the guidance system if needed.

What is claimed is:

1. An apparatus for improving a fault tolerance of a rocket or missile guidance system, the rocket or missile guidance system including a resonant sensor, the apparatus comprising:
    a fault detection module configured to receive guidance data originating from the resonant sensor, compare the guidance data with specified physical performance limits of the rocket or missile, determine if the guidance data exceeds the physical performance limits, and transmit a fault detection signal if the guidance data exceeds the physical performance limits; and
    a reset module configured to receive the fault detection signal from the fault detection module, the reset module being configured to initiate a reinitializing sequence which will reinitialize the resonant sensor when the fault detection signal is received from the fault detection module.

2. The apparatus of claim 1, further comprising a Built-In Test (BIT) module cooperative with the resonant sensor and configured to detect at least one failure modality of the resonant sensor, the BIT module being configured to transmit a BIT error signal if it detects at least one failure modality, the fault detection module being configured to receive the BIT error signal and to transmit the fault detection signal when it receives the BIT error signal.

3. The apparatus of claim 1, wherein the reinitializing sequence is substantially identical to a power-up initializing sequence which initializes the resonant sensor upon activation of the rocket or missile.

4. The apparatus of claim 1, further comprising a data output module cooperative with the resonant sensor and configured to receive the fault detection signal from the fault detection module, the data output module being configured to prevent the rocket or missile from acting upon the guidance data when the fault detection signal is received from the fault detection module.

5. The apparatus of claim 1, wherein the specified physical performance limits include at least one limit pertaining to roll of the rocket or missile.

6. The apparatus of claim 1, wherein the specified physical performance limits include at least one limit relating to pitch of the rocket or missile.

7. The apparatus of claim 1, wherein the specified physical performance limits include at least one limit relating to yaw of the rocket or missile.

8. A method for improving a fault tolerance of a rocket or missile guidance system, the rocket or missile guidance system including a resonant sensor, the method comprising:
    receiving guidance data from the guidance system;
    comparing the guidance data with specified physical performance limits of the rocket or missile;
    determining if the guidance data exceeds the physical performance limits; and
    if the guidance data exceeds the physical performance limits, initiating a reinitializing sequence which will reinitialize the resonant sensor.

9. The method of claim 8, further comprising:
    determining if a Built-In Test (BIT) module cooperative with the resonant sensor has detected improper operation of the resonant sensor; and
    initiating the reinitializing sequence if the BIT has detected improper operation of the resonant sensor.

10. The method of claim 8, wherein the reinitializing sequence is substantially identical to a power-up initializing sequence which initializes the resonant sensor upon activation of the rocket or missile.

11. The method of claim 8, further comprising preventing the rocket or missile from acting upon the guidance data when the fault detection signal is received from the fault detection module.

12. The method of claim 8, wherein the specified physical performance limits include at least one limit pertaining to roll of the rocket or missile.

13. The method of claim 8, wherein the specified physical performance limits include at least one limit pertaining to pitch of the rocket or missile.

14. The method of claim 8, wherein the specified physical performance limits include at least one limit pertaining to yaw of the rocket or missile.

* * * * *